(12) United States Patent
Jewett

(10) Patent No.: US 12,085,152 B2
(45) Date of Patent: Sep. 10, 2024

(54) APPARATUS AND METHOD FOR CONVERTING BETWEEN LINEAR AND ROTARY MOTION AND SYSTEMS INVOLVING THE SAME

(71) Applicant: Sencera Energy, Inc., Charlotte, NC (US)

(72) Inventor: Russell F. Jewett, Lake Wylie, SC (US)

(73) Assignee: Sencera Energy, Inc., Charlotte, NC (US)

( * ) Notice: Subject to any disclaimer, the term of this patent is extended or adjusted under 35 U.S.C. 154(b) by 0 days.

(21) Appl. No.: 18/087,972

(22) Filed: Dec. 23, 2022

(65) Prior Publication Data

US 2023/0175576 A1  Jun. 8, 2023

Related U.S. Application Data

(62) Division of application No. 17/457,409, filed on Dec. 2, 2021, now Pat. No. 11,536,353.

(51) Int. Cl.
*F16H 23/08* (2006.01)
*F01B 3/02* (2006.01)

(52) U.S. Cl.
CPC ............... *F16H 23/08* (2013.01); *F01B 3/02* (2013.01)

(58) Field of Classification Search
CPC .......... F16H 21/18; F16H 21/22; F16H 21/34; F16H 23/08; F16H 23/10; F01B 29/12; F02G 2243/04; F02G 2270/85
See application file for complete search history.

(56) References Cited

U.S. PATENT DOCUMENTS 2,102,196 A * 12/1937 Craske .................... F16H 21/18
 74/44
2,105,019 A *  1/1938 Turner ..................... F16H 23/08
 91/506

(Continued)

FOREIGN PATENT DOCUMENTS

CN       106594211 A  *  4/2017
CN       106917733 A  *  7/2017

(Continued)

OTHER PUBLICATIONS

FR 3068444 B1 (Bertrand Cottereau) Oct. 11, 2019 (full text). [online] [retrieved on Apr. 12, 2023]. Retrieved from: Clarivate Analytics. (Year: 2019).*

(Continued)

*Primary Examiner* — Joseph Brown
(74) *Attorney, Agent, or Firm* — Finnegan, Henderson, Farabow, Garrett & Dunner, LLP

(57) ABSTRACT

An apparatus and a method for converting linear motion to rotary motion are provided. In some embodiments, the apparatus may include a plate having a plurality of connection points and a channel. The apparatus may also include a wobbler having an end that extends along the first axis and a cylindrical body having a second axis that is offset from the first axis by a first angle. The plate may be rotatably connected to the cylindrical body and configured to rotate about the second axis. The apparatus may further include a plurality of flexure assemblies connected to the plurality of connection points of the plate.

10 Claims, 15 Drawing Sheets

(56) References Cited

U.S. PATENT DOCUMENTS

| | | | |
|---|---|---|---|
| 2,424,532 A * | 7/1947 | Beard | F16H 21/24 |
| | | | 74/44 |
| 3,359,810 A | 12/1967 | Hansen | |
| 4,631,922 A * | 12/1986 | Kleinwachter | F02G 1/0435 |
| | | | 60/520 |
| 5,630,351 A | 5/1997 | Clucas | |
| 6,119,537 A | 9/2000 | Jost | |
| 6,637,312 B1 | 10/2003 | Clucas et al. | |
| 2003/0037627 A1 | 2/2003 | Green | |
| 2007/0199391 A1 * | 8/2007 | Fourqurean | F04B 1/02 |
| | | | 74/25 |
| 2010/0132354 A1 | 6/2010 | Fanner et al. | |
| 2017/0241451 A1 | 8/2017 | Jewett et al. | |
| 2019/0186354 A1 * | 6/2019 | Hofbauer | F02B 75/246 |

FOREIGN PATENT DOCUMENTS

| | | | | |
|---|---|---|---|---|
| CN | 106917734 A | * | 7/2017 | |
| CN | 106949214 A | * | 7/2017 | |
| CN | 107387697 A | * | 11/2017 | |
| DE | 2606874 A1 | * | 9/1977 | |
| FR | 3068444 B1 | * | 10/2019 | F25B 9/14 |
| JP | 58037370 A | * | 3/1983 | |
| WO | WO-2009157787 A1 | * | 12/2009 | F01B 3/02 |

OTHER PUBLICATIONS

CN 106949214 A (Yong Cai) Jul. 14, 2017 (full text). [online] [retrieved on Apr. 12, 2023]. Retrieved from: Clarivate Analytics. (Year: 2017).*

CN 106917733 A (Feng-ling Luo) Jul. 4, 2017 (full text). [online] [retrieved on Oct. 19, 2023]. Retrieved from: Clarivate Analytics. (Year: 2017).*

WO 2009157787 A1 (Damien Blogg) Dec. 30, 2009 (full text). [online] [retrieved on May 5, 2022]. Retrieved from ProQuest Dialog. (Year: 2009).
N

* cited by examiner

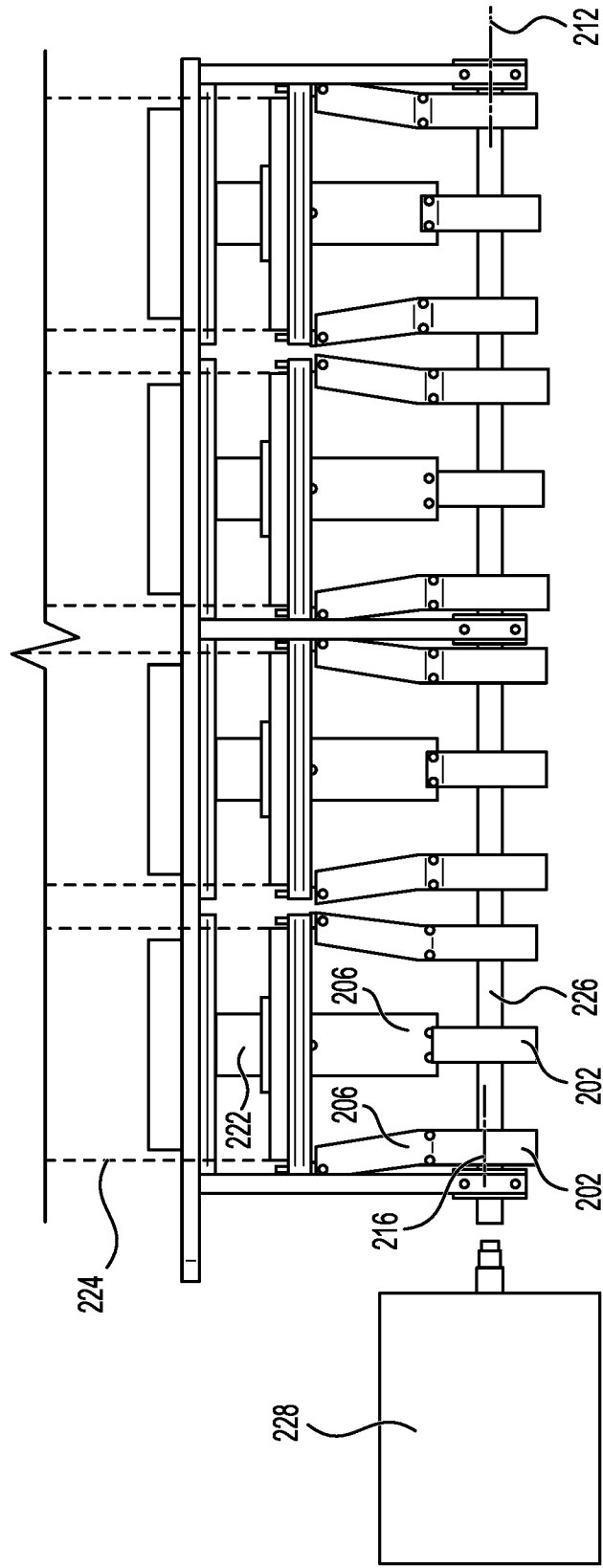

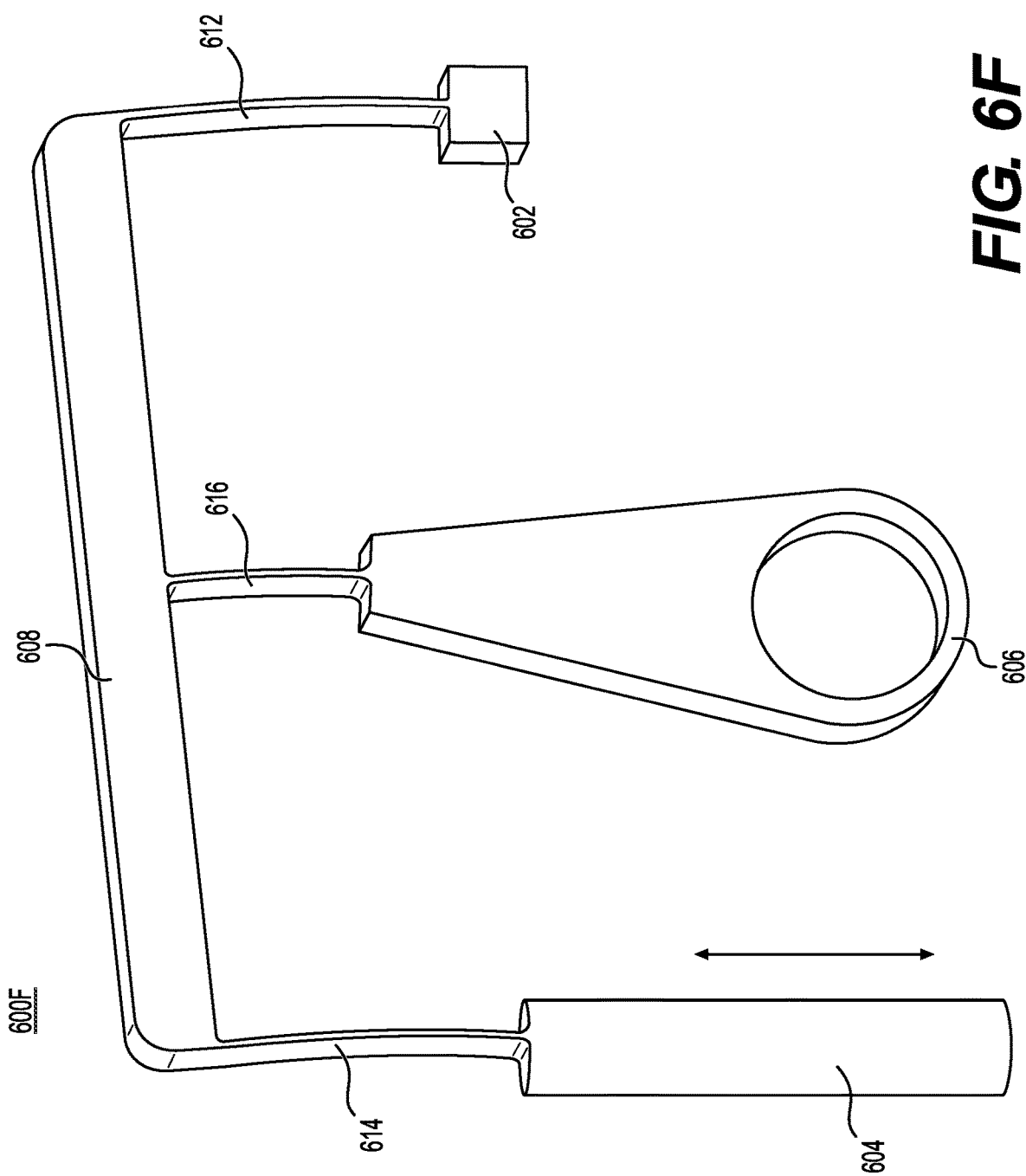

APPARATUS AND METHOD FOR CONVERTING BETWEEN LINEAR AND ROTARY MOTION AND SYSTEMS INVOLVING THE SAME

CROSS-REFERENCE TO RELATED APPLICATIONS

This application is a divisional of U.S. application Ser. No. 17/457,409, filed Dec. 2, 2021, and to be issued as U.S. Pat. No. 11,536,353 on Dec. 27, 2022. The contents of the above are incorporated herein by reference.

TECHNICAL FIELD

The present disclosure generally relates to mechanical linkages. More particularly, the present disclosure relates to apparatuses and methods for converting between linear motion and rotary motion and systems involving them.

BACKGROUND

Engines may convert chemical energy or heat energy to kinetic energy. These engines may involve driving a piston in a linear movement to create kinetic energy. For example, an internal combustion engine may drive a piston by igniting fuel, which creates pressure, applying a force to a piston head to drive the piston through a cylinder. In other types of engines, such as heat engines, steam or hot air may create pressure to similarly apply pressure to move a piston. In these examples, the piston may move in a linear fashion. Certain application, however, may require a rotational movement. For example, in transportation applications, rotational force may be needed to drive wheels. Other example applications may also utilize rotational movement, such as driving a generator to create electricity.

SUMMARY

Embodiments of the present disclosure may relate to an apparatus for converting between linear motion and rotary motion about a first axis. In some embodiments, the apparatus may include a plate having a plurality of connection points, a wobbler having an end that extends along the first axis and a cylindrical body having a second axis that is offset from the first axis by a first angle. The plate may be rotatably connected to the cylindrical body and configured to rotate about the second axis. The apparatus may also include a plurality of flexure assemblies connected to the plurality of connection points of the plate. The plurality of flexure assemblies may include a first flexure having a having a first end, a second end, a length extending in a direction parallel to the first axis, a width extending radially from the first axis, and a thickness. The plurality of flexure assemblies may also include a second flexure having a first end, a second end, a length extending in a direction parallel to the first axis, a width extending tangentially from the first axis, and a thickness. The first end of the first flexure may be connected to the first end of the second flexure. The second end of the first flexure may be connected to the plate. The second end of the second flexure may be configured to move in a direction parallel to the first axis.

Embodiments of the present disclosure may include an apparatus for converting between linear motion and rotary motion about a first axis. In some embodiments, the apparatus may include a plate having at least one connection point extending outwards and a channel through the center. The apparatus may also include a wobbler having an end that extends along the first axis and at least one cylindrical body having a second axis that is parallel to the first axis and offset from the first axis. The plate may be rotatably connected to the cylindrical body and configured to rotate about the second axis. The apparatus may also include a flexure having a having a first end, a second end, a length extending in a direction perpendicular to the second axis, a width extending parallel to the second axis, and a thickness. The first end of the flexure may be connected to a first connection point of the at least one connection point of the plate. The second end of the flexure may be configured to move in a direction perpendicular to the first axis.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of certain disclosed embodiments as set forth in the accompanying claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

FIG. 6C is a side view of the exemplary apparatus in FIG. 6A.

FIGS. 6E and 6F are perspective views of example configurations of the exemplary apparatus shown in FIG. 6D, according to embodiments of the present disclosure.

Similar reference numerals refer to similar parts throughout the several views of the drawings.

DETAILED DESCRIPTION

Figure 1:
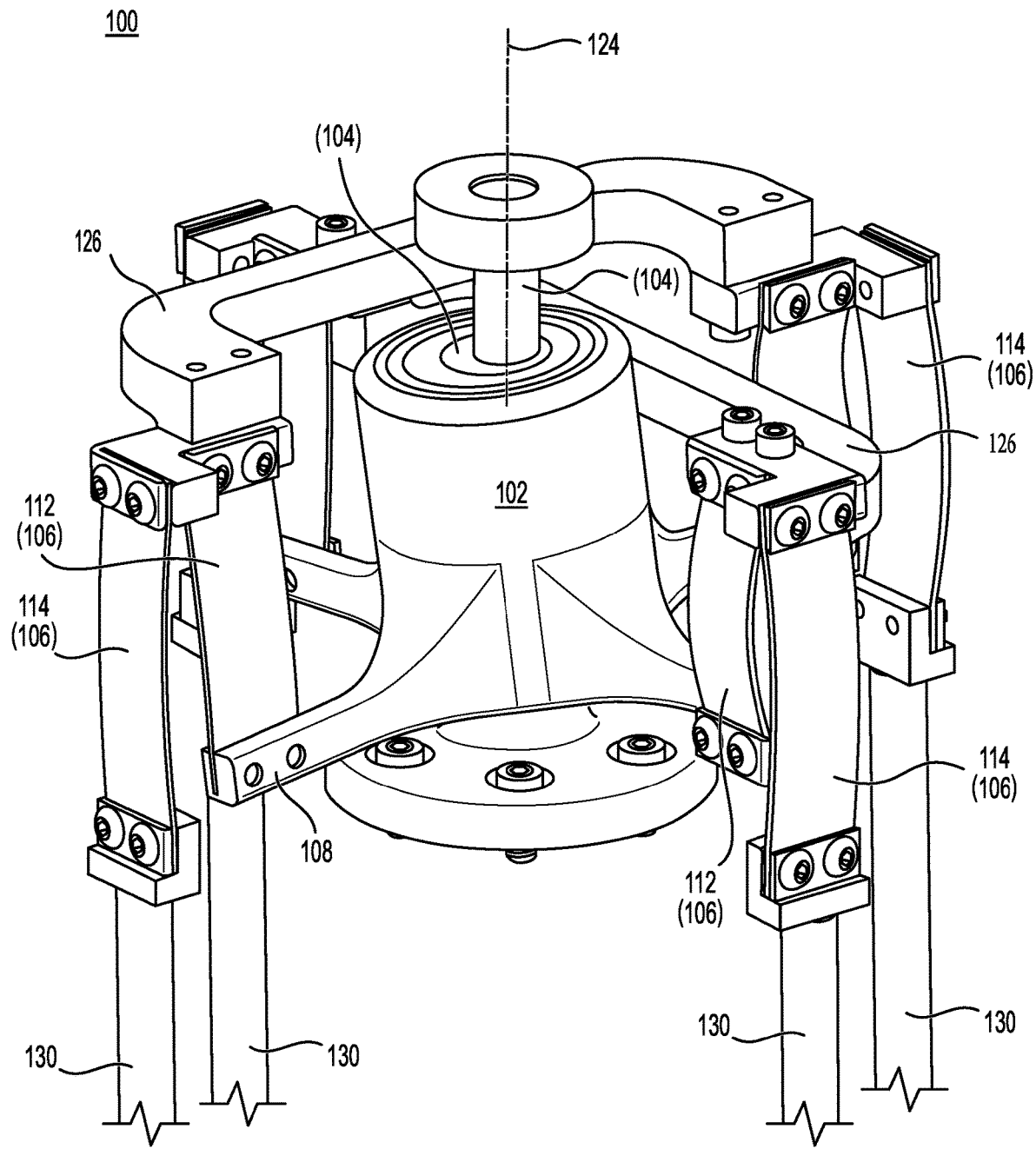
FIG. 1 is a perspective view of an exemplary apparatus for converting between linear motion and rotary motion, according to embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed embodiments may relate to a mechanical linkage to convert between rotary and linear motion, which may be referred to as a rotary flex joint. Disclosed embodiments may reduce the number of moving parts necessary to convert between linear and rotary motion. For example, rather than using bearings, which can ear out over time, may have added expense, may require maintenance (e.g., lubrication), and/or may require an excessive number of moving parts. For example, bearings may include discrete bearing rings (e.g., outer and inner), rolling elements (e.g., rollers, balls), and/or cage parts to secure rolling elements. Disclosed embodiments may address these problems by using one or more flexures. For example, flexures may be used in disclosed embodiments to reduce the number of bearings, which may also reduce the number of friction surfaces and/or moving parts. Flexures may, for example, temporarily store necessary shifts as elastic potential energy, as opposed to dissipating the energy through friction within bearings.

Disclosed embodiments may operate using rotary motion. Rotary motion may rotate about an axis and may also be referred to as rotational motional. In some embodiments, the rotational motion may utilize a constant rotational speed and/or torque. In other embodiments, the rotational movement may change in speed or torque over time. Example sources of rotational motion input may include one or more electric motors or other power producing rotary sources. Example output (or receiving) devices of rotational motion may include one or more electrical generators, turbines, compressors, or other power generation or power storage devices.

Disclosed embodiments may operate using linear motion. In embodiments linear motion may alternate or oscillate along a given axis over time, which may be referred to as a repetitive linear movement. For example, the motion may move out and back (or up and down) along a line or given axis over time. In some embodiments, the motion may oscillate, such as forming a sinusoidal displacement pattern. In other embodiments, the motion may move in other displacement patterns, such as a square wave (or as reasonably square as can be), pulse, triangular wave, sawtooth wave, or other pattern of motion alternating between an extended and unextended positions. Example sources of linear motion input may include piston-driven engines (e.g., internal-combustion engines, heat engines, Stirling-cycle engines), linear actuators, or other devices that generate a linear motion. Example output (or receiving) devices of rotational motion may include compressors, cryocoolers, heat engines, water pumps, or other device that may operate using a linear motion as input.

The rotary flex joint of disclosed embodiments may be bidirectional. Although some embodiments discuss either converting rotary motion to repetitive linear motion or converting repetitive linear motion to rotary motion, the rotary flex joint as described in the present disclosure may be capable of converting between repetitive linear motion and rotary motion, using either the linear or the rotary motion as the driving input. For example, disclosed embodiments may receive power from a rotational drive, such as a motor (e.g., an AC or DC electrical motor). Disclosed embodiments may use that rotational input to produce linear motion, such as an oscillating linear motion. In other examples, disclosed embodiments may receive power from an oscillating linear motion, such as a piston or actuator (e.g., a Stirling-cycle engine, a hear engine, an internal combustion engine). Disclosed embodiments may use the that linear input to provide rotational motion as an output. In bidirectional embodiments, the same system may be capable of receiving input from both linear motion and rotational motion.

Figure 2:
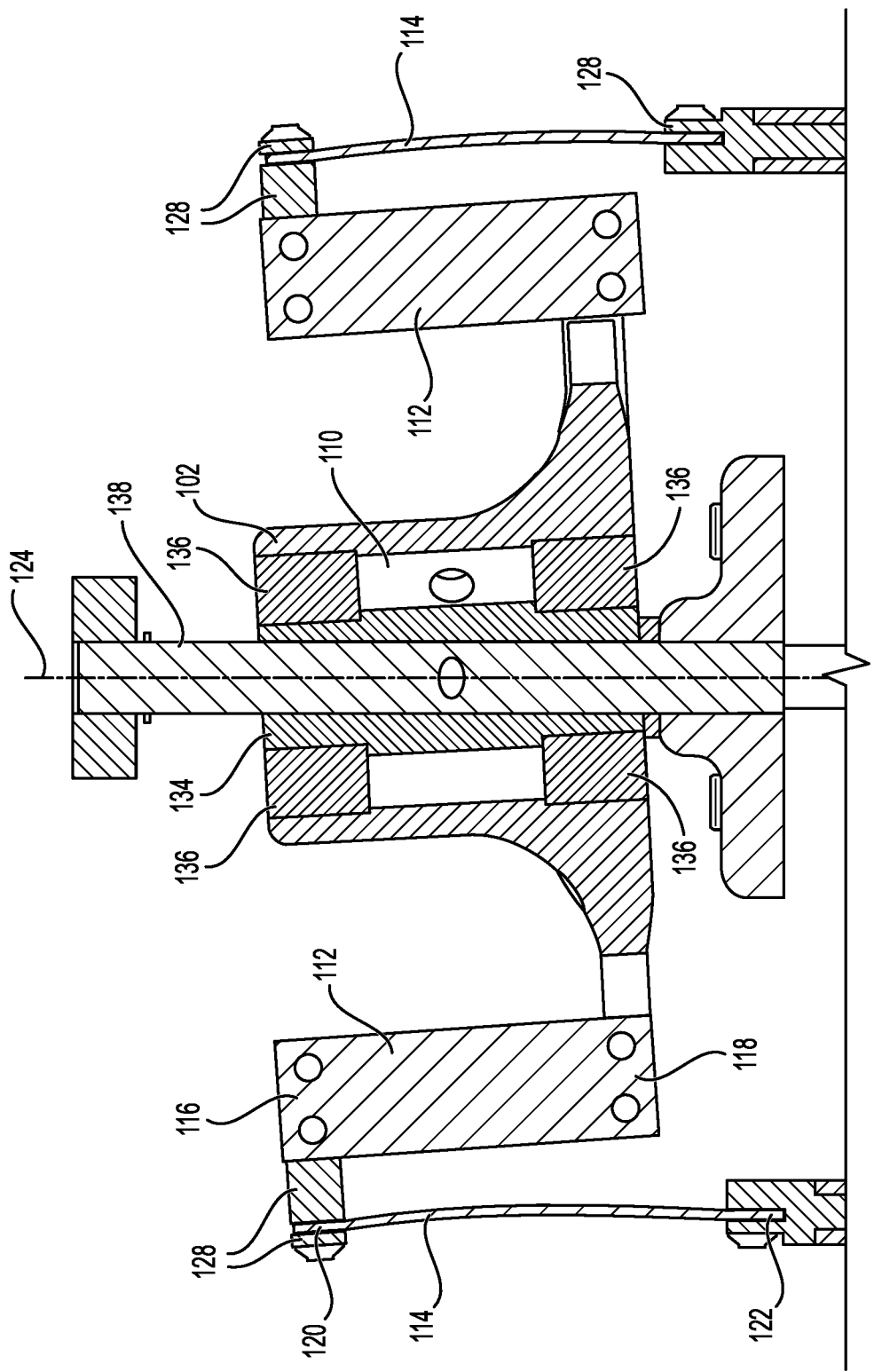
FIG. 2 is a cross-sectional view of the exemplary apparatus in FIG. 1.

FIGS. 1 and 2 depict an exemplary assembly for converting between linear and rotational motion, according to embodiments of this disclosure. The exemplary assembly may be referred to as rotary flex joint 100. In some embodiments, as shown in FIGS. 1 and 2, rotary flex joint 100 may include a plate 102, a wobbler assembly 104, and a plurality of flexure assemblies 106. The relatively orientation and placement of each of the components may be altered from that shown in FIGS. 1 and 2 consistent with the descriptions of this disclosure.

In some embodiments, plate 102 may be connected to wobbler assembly 104 through one or more bearings 136. As shown, due to an angular difference between the axis of the bearing and the axis of the rotational drive, as wobbler assembly 104 rotates, the orientation of the rotational axis of plate 102 may change, which may form a precession-like movement. For example, as the axis of plate 102 rotates about the axis of the rotational drive, points along plate 102, although they themselves may not rotate, may move in an alternating linear motion along the axis of the rotational drive. In some embodiments, this linear-to-rotary translation in movement may be bidirectional. For example, alternating linear movement along one or more points of plate 102 may cause wobbler assembly 104 to rotate.

In some embodiments, plate 102 may have a plurality of connection points 108 and a channel 110. For example, connections 108 may include a clamping to attach to a flexure. The clamp may use one or more screws to secure the flexure to one of connection points 108. Other attachment mechanisms may be used, such as a bolt, nut, glue, spring, or a combination thereof. Other ways to fix a flexure assemblies 106 to plate 102 may be used consistent with disclosed embodiments.

In some embodiments, the plurality of flexure assemblies 106 may be equally spaced about plate 102. For example, as shown, four flexure assemblies 106 may be spaced ninety degrees apart each on plate 102. Although not shown in FIGS. 1 and 2, in other embodiments, flexure assemblies may be spaced unequally or irregularly. For example, four flexure assemblies may be spaced about plate 102 with twenty degrees about the axis normal to the plane of plate 102 separating them (with 120 degrees spanning the two bookend flexure assemblies). Still other positioning of flexure assemblies relative to plate 102 may be employed, such as irregular spacing. As discussed in this disclosure additional numbers of flexure assemblies 106 may be attached to plate 102.

In some embodiments, flexure assembly 106 may include a first flexure 112 and a second flexure 114. First flexure 112 may have a first end 120 and a second end 122. Second flexure 114 may have a first end 120 and a second end 122. In some embodiments, both first flexure 112 and second flexure 114 may have a length extending in a direction parallel to an axis 124, a width extending in one direction and a thickness. Therefore, both first flexure 112 and second flexure 114 may flex in one direction and be stiff in another direction perpendicular to the first direction. In some embodiments, both first flexure 112 and second flexure 114 may be flat springs.

In some embodiments, first flexure 112 and second flexure 114 may be made of any material, both metal and non-metal. In some embodiments, first flexure 112 and second flexure 114 are made of 300 series stainless steel (e.g., 304, 304L, 305, etc.), carbon steel (e.g., 1091 steel, 1095 steel, etc.), or aluminum alloy. The bending stress of this material may be less than 400 MPa, or less than 300 MPa. In some embodiments, this material may have a high fatigue strength. In some embodiments, first flexure 112 and second flexure 114 are made of a same material and have same material properties. In some embodiments, first flexure 112 and second flexure 114 may be made of different materials and/or have different material properties and dimensions.

In some embodiments, first end 120 of first flexure 112 may be connected to first end 120 of second flexure 114; second end 122 of each of first flexure 112 may be connected to plate 102 at one of the plurality of connection points 108; and/or second end 122 of second flexure 114 may be configured to move in a direction parallel to axis 124. In some embodiments, first flexure 112 and second flexure 114 may be connected through a rocker bar 126. In some embodiments, rocker bar 126 may also connect multiple flexure assemblies 106. In some embodiments, the connections between first flexure 112 and second flexure 114, between first flexure 112 and connection points 108, and between second flexure 114 and the member configured to linear movement, may include a clamp 128. Both rocker bar 126 and clamp 128 may have rounded corners for stress concentration relief purposes.

In some embodiments, first flexure 112 may be configured to deflect in a direction tangential to axis 124 and stiff in a direction radial to axis 124; second flexure 114 may be configured to deflect in a direction radial to axis 124 and stiff in a direction tangential to axis 124. In some embodiments, first flexure 112 and second flexure 114 may deflect in perpendicular directions orthogonal to axis 124. While the first and second flexures are shown have a particular axis of deflection in the figures, in some embodiments the flexures may be oriented such that the deflection direction of first flexure 112 and second flexure 124 are swapped.

In some embodiments, second end 122 of each second flexure 114 is subjected to a linear repetitive movement of a rod 130. In some embodiments, rod 130 is driven by a Stirling-cycle engine (not shown in FIGS. 1 and 2.) In some embodiments, the Stirling-cycle engine is a four-cylinder alpha Stirling-cycle engine. In some embodiments, rod 130 drives a Stirling-cycle heat pump (not shown in FIGS. 1 and 2.) In some embodiments, the Stirling-cycle heat pump is a four-cylinder alpha Stirling-cycle heat pump.

Figure 3A:
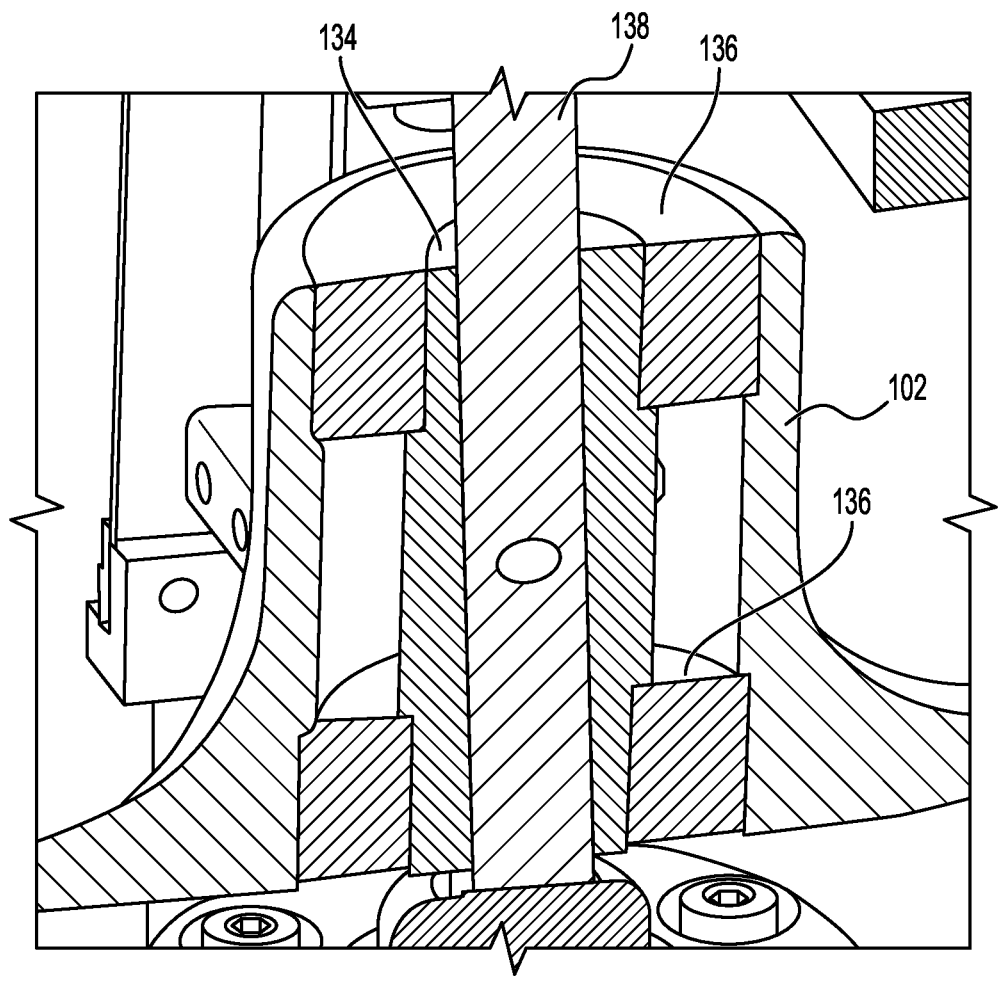
FIG. 3A is a cross-sectional perspective view of the exemplary apparatus in FIG. 1.

FIG. 3A depicts a zoom-in cross-sectional perspective view of the exemplary apparatus in FIG. 1. In some embodiments, channel 110 of plate 102 may be through the center of plate 102 and along axis 132. In some embodiments, wobbler assembly 104 may include wobbler 134. Wobbler 134 may include a cylindrical body. Plate 102 may be rotatably connected to wobbler 134 by connecting the inside of channel 110 and the outside of wobbler 134. Plate 102 therefore may be configured to rotate about axis 132. In some embodiments, plate 102 may be rotatably connected to wobbler 134 by at least two bearings 136. In some embodiments, bearings 136 may be cylindrical roller bearings, ball bearings, or other devices that connect the two components while allowing them to freely rotate about an axis with reduced or minimal friction.

In some embodiments, wobbler assembly 104 may include shaft 138. Shaft 138 may be configured to spin about axis 124. Axis 124 and axis 132 may be oriented to have a predetermined angle θ relative to each other. As previously discussed, as the plane formed by axis 124 and 132 rotates about axis 124, points along plate 102 may oscillate or tilt.

Figure 3B:
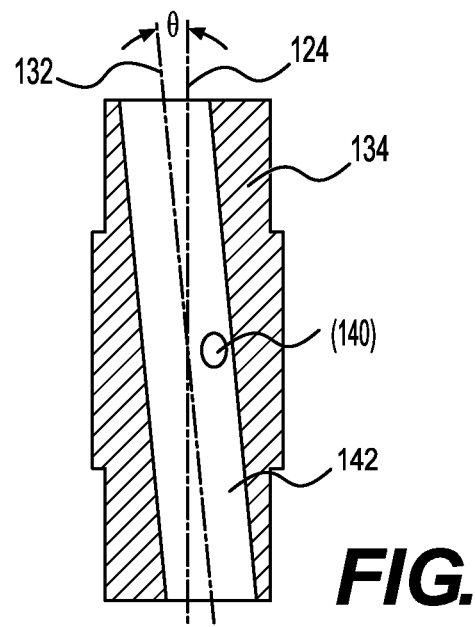
FIG. 3B is a cross-sectional view of a component that may be used in an exemplary apparatus for converting between linear motion and rotary motion, according to embodiments of the present disclosure.

FIG. 3B is a cross-sectional view of a wobbler, according to some embodiments of the present disclosure. In some embodiments, as shown in FIG. 3A-3B, wobbler 134 and shaft 138 are two separate pieces joined by a pin 140. Wobbler 134 has a channel 142. Shaft 138 extends through channel 142 of wobbler 134. Rotational and longitudinal movements of shaft 138 relative to wobbler 134 is restricted by pin 140.

In some embodiments, the repetitive movements of rods 130 are synchronized so rods are moving up sequentially and radially symmetrically. In an example embodiment, rotary flex joint 100 may include an even number of rods 130. In this example, when a first rod 130a moves up, the rod on the opposite side of first rod 130a may move down. When first rod 130a reaches the proximal extreme, the rod on the opposite side of first rod 130a may reach the distal extreme. After first rod 130a reaches the proximal extreme, rod 130b next to first rod 130a may reach the proximal extreme, and the rod on the opposite side of rod 130b may reach the distal extreme. As such, rods 130 may be synchronized with the tilt of plate 102, which in turn may drive or may be driven by the rotation of wobbler 134 relative to plate 102, thus may convert to or from a rotary motion around axis 124.

In some embodiments, wobbler assembly 104 may extend along axis 124 and may be connected to deliver a rotary movement. In some embodiments, wobbler assembly 104 may be connected to drive an electrical generator (not shown).

In some embodiments, wobbler assembly 104 may extend along axis 124 and may be connected to receive a rotary movement. In some embodiments, wobbler assembly 104 may be connected to be driven by an electrical motor (not shown).

FIGS. 4A, 4B, 4C, and 4D are perspective views of example states of operation of the exemplary apparatus in FIG. 1. For example, FIGS. 4A, 4B, 4C, and 4D may illustrate different working phases of rotary flex joint 100, according to some embodiments of the present disclosure. In some exemplary embodiments, as shown in FIGS. 4A-4D, rods 130a, 103b, 103c, and 103d may be driven by phase-offset oscillating linear motion. For example, rods 130a, 103b, 103c, and 103d may be driven by each of the cylinders of a four-cylinder alpha Stirling-cycle engine (not shown). Accordingly, the plurality of connection points 108 may include four corresponding branches 108a, 108b, 108c, and 108d extending away from channel 110 and the plurality of flexure assemblies 106 may include four flexure assemblies 106a, 106b, 106c, and 106d attached to four connection points 108a, 108b, 108c, and 108d on four branches. In this example, matching suffix letter may indicate that components are on a same branch. For example, flexure assembly 106a (e.g., first flexure 112a, second flexure 114a) may be connected to connection point 108a, second end 122a of second flexure 114a may be connected to rod 130a, etc.

Figure 4A:
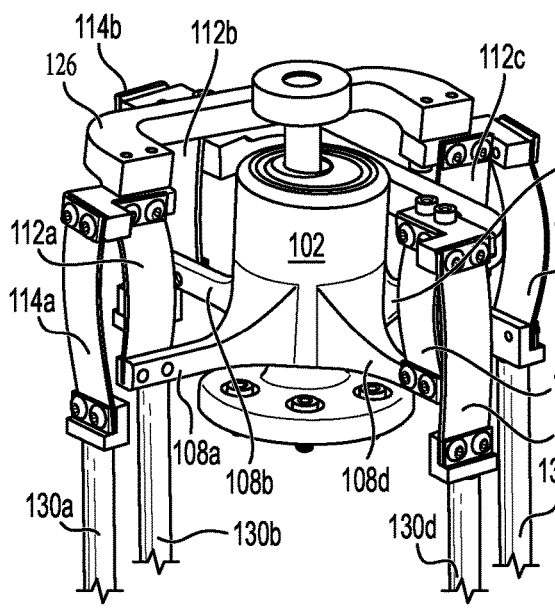
FIGS. 4A, 4B, 4C, and 4D are perspective views of various configurations of the exemplary apparatus in FIG. 1, according to embodiments of the present disclosure.

As shown in FIG. 4A, when rod 130a reaches its upper extreme, the rod on the opposite side, rod 130c, may reach its lower extreme. At the same time, rods 130b and 130d may be at the middle of their upward stroke or downward stoke, respectively. To compensate the plate 102 tilt, second flexure 114a may be bent outwards, second flexure 114c is bent inwards, and first flexures 112b and 112d are bent toward branch 108a side.

Figure 4B:
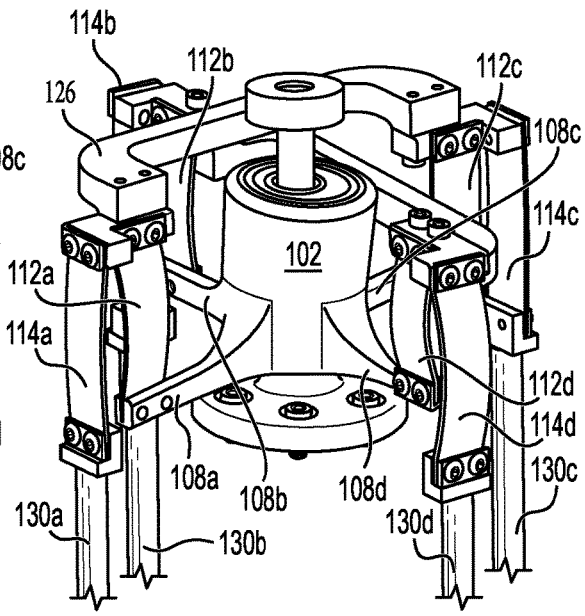

As shown in FIG. 4B, when rod 130a may be in the middle of its downward stroke, rod 130b may reach its upper extreme, the rod on the opposite side, rod 130d, may reach its lower extreme, and rod 130c may be at the middle of its upward stroke. To compensate the plate 102 tilt in this position, second flexure 114b may be bent outwards, second flexure 114d may be bent inwards, and first flexures 112a and 112c may be bent toward the side where branch 108b is located.

Figure 4C:
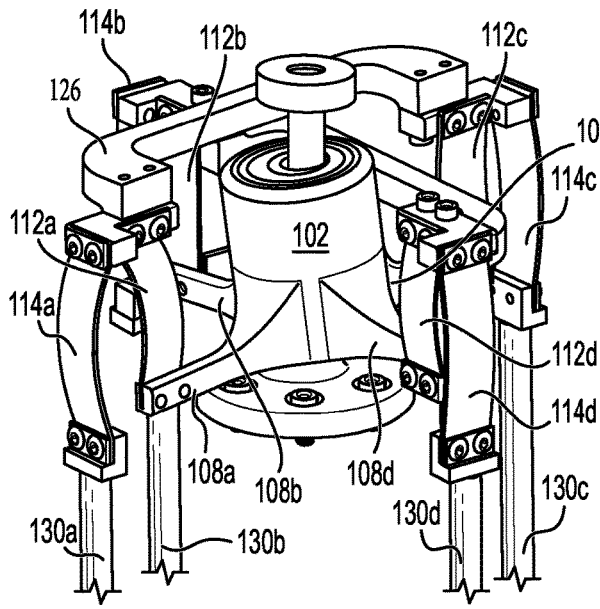

As shown in FIG. 4C, when rod 130b is in the middle of its downward stroke, rod 130c may reach its upper extreme, the rod on the opposite side, rod 130a, may reach its lower extreme, and rod 130d may be at the middle of its upward stroke. To compensate for the tilt of plate 102 in this position, second flexure 114c may be bent outwards, second flexure 114a may be bent inwards, and first flexures 112b and 112d may be bent towards the side where branch 108c is located.

Figure 4D:
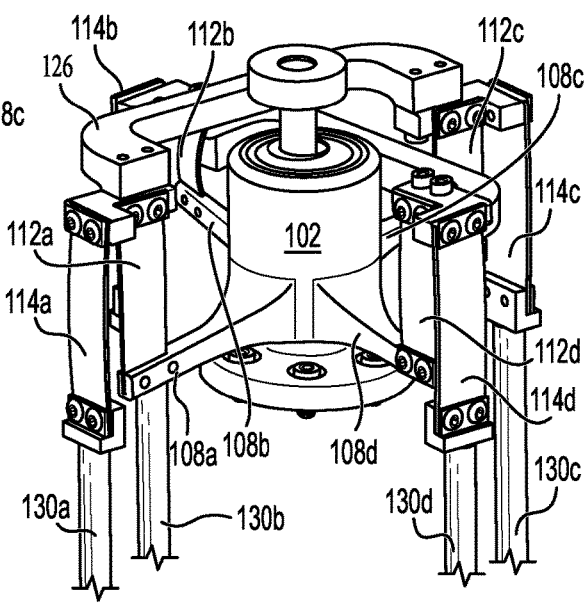

As shown in FIG. 4D, when rod 130c is in its downward stroke, rod 130d may reach its upper extreme, the rod on the opposite side, rod 130b, may reach its lower extreme, and rod 130a may be at the middle of its upward stroke. To compensate for the tilt of plate 102 in this position, second flexure 114d may be bent outwards, second flexure 114b may be bent inwards, and first flexures 112c and 112a may be bent toward the side where branch 108d is located.

Although presented as a repetitive linear motion to rotary motion conversion, the exemplary apparatus shown in FIGS. 4A-4D may convert a rotary motion to repetitive linear motions. Accordingly, an electrical motor may be used to drive a four-cylinder alpha Stirling-cycle heat pump or other linear driven device (not shown).

FIGS. 5A, 5B, 5C, 5D, 5E, and 5F illustrate cross-sectional and top views of example plate designs, according to some exemplary embodiments of the present disclosure. As previously discussed, plate 102 may function by being connected with any number of rods 130. In some embodiments, rods 130 may be attached to plate 102 using flexure assemblies 106 that are equally spaced about plate 102. In other embodiments, flexure assemblies may be irregularly spaced, as previously discussed.

Figure 5A:
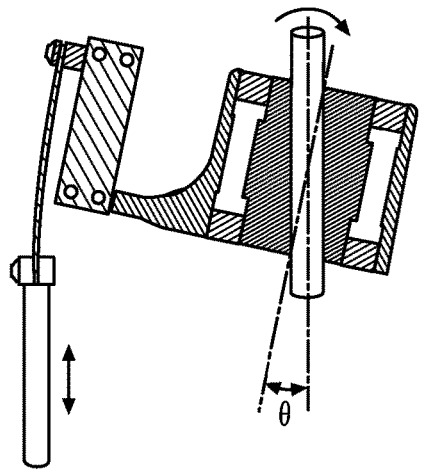
FIGS. 5A, 5B, 5C, 5D, 5E, and 5F are diagrams of exemplary apparatuses for converting between linear motion and rotary motion, according to embodiments of the present disclosure.
Figure 5B:
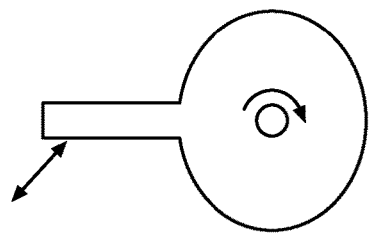

FIG. 5A and FIG. 5B depict an exemplary embodiment of assembly 500A (e.g., an embodiment of rotary flex joint 100) where plate 502A includes a single branch 508A, and therefore only one flexure assembly 506A. As wobbler assembly 504A rotates about shaft axis 524A, connection point 508A may tilt up and down. This motion may be accomplished by a linkage (e.g., bearings 536A) that allows plate 502A to remain rotationally fixed relative to shaft axis 524A. Because plate axis 532A (e.g., the axis about which the bearings rotate) is offset by angle θ, connection point 508A may tilt up and down (e.g., +/−angle θ degrees) as shaft 538A rotates. Flexure assembly 506A allows this tilting movement to be translated to a motion of rod 530A that is linear, parallel to shaft axis 524A.

Figure 5C:
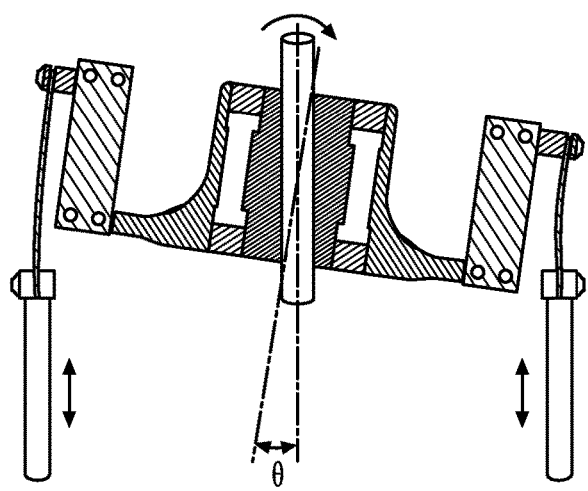
Figure 5D:
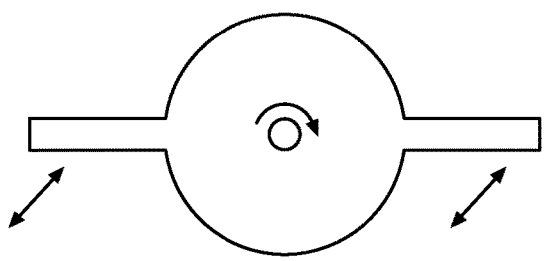

FIG. 5C and FIG. 5D depict an exemplary embodiment of assembly 500C (e.g., an embodiment of rotary flex joint 100) where plate 502C includes two branches 508C, and therefore only two of flexure assembly 506C. As wobbler assembly 504C rotates about shaft axis 524C, connection points 508C may tilt up and down. Because connection points 508C are located at opposite sides of plate 502C, they may move in opposite directions. For example, connection point 508C on the left side tilts upward, connection point 508C on the right side may tilt downward. This motion may be accomplished by a linkage (e.g., bearings 536C) that allows plate 502C to remain rotationally fixed relative to shaft axis 524C. Because plate axis 532C (e.g., the axis about which the bearings rotate) is offset by angle θ, connection points 508C may tilt up and down (e.g., +/−angle θ degrees) as shaft 538C rotates. Flexure assembly 506C allows this tilting movement to be translated to a motion of rods 530C that is linear, parallel to shaft axis 524C. However, because the motion of each of connection points 508C may be phase-offset, the linear motion of the correspond rod 530C may also be offset by the same phase. Although the two connection points 508C are shown as being diametrically opposed (e.g., spaced 180 degrees apart), in some embodiments, the spacing between the two connection points 508BC may be less than 180 degrees, which would allow the phase offset of the linear motion of rods 530C to be offset by the corresponding amount.

Figure 5E:
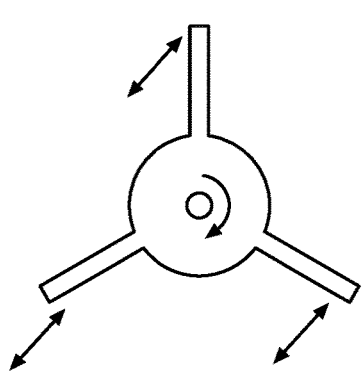

FIG. 5E depicts an exemplary embodiment of assembly 500E (e.g., an embodiment of rotary flex joint 100) where plate 502E includes three branches 508E, and therefore three of flexure assembly 506E. Although the three connection points 508E are shown as being diametrically opposed (e.g., spaced 120 degrees apart), in some embodiments, the spacing between the three connection points 508E may be less than 120 degrees, which would allow the phase offset of the linear motion of rods connected to connection points 508E to be offset by the corresponding amount.

Figure 5F:
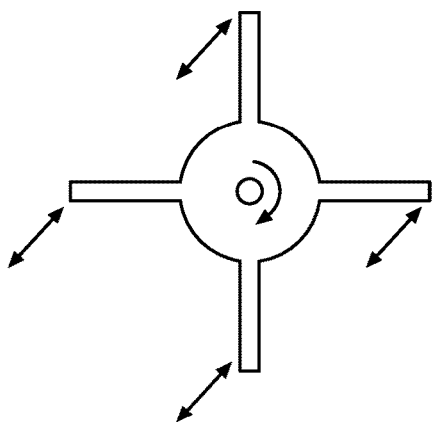

FIG. 5F depicts an exemplary embodiment of assembly 500F (e.g., an embodiment of rotary flex joint 100) where plate 502F includes four branches 508F, and therefore four of flexure assembly 506F. Although the three connection points 508F are shown as being diametrically opposed (e.g., spaced 90 degrees apart), in some embodiments, the spacing between the four connection points 508F may be less than 90 degrees, which would allow the phase offset of the linear motion of rods connected to connection points 508F to be offset by the corresponding amount. The spacing may be set such that a desired phase offset for the linear motion is achieved.

Although not shown, additional number of connection points and corresponding flexure assemblies may be used, consistent with disclosed embodiments. For example, 5, 6, 7, 8, 9, 10, or even more numbers of connection points and flexure assemblies may be used. Although not shown, the amount of linear motion generated may be controlled by adjusting the angle between the plate axis (e.g., plate axis 132) and the shaft axis (e.g., shaft axis 124), the distance of the connection point from the plate axis, or both. For example, the angle may be increased so that the plate (e.g., plate 102) tilts through a larger angle. Additionally, the distance of the connection point from the plate axis may also increase the stroke length of the resulting linear motion, since the movement of the tilt along the direction of the shaft axis increases as the distance from the shaft axis increases.

Figure 6A:
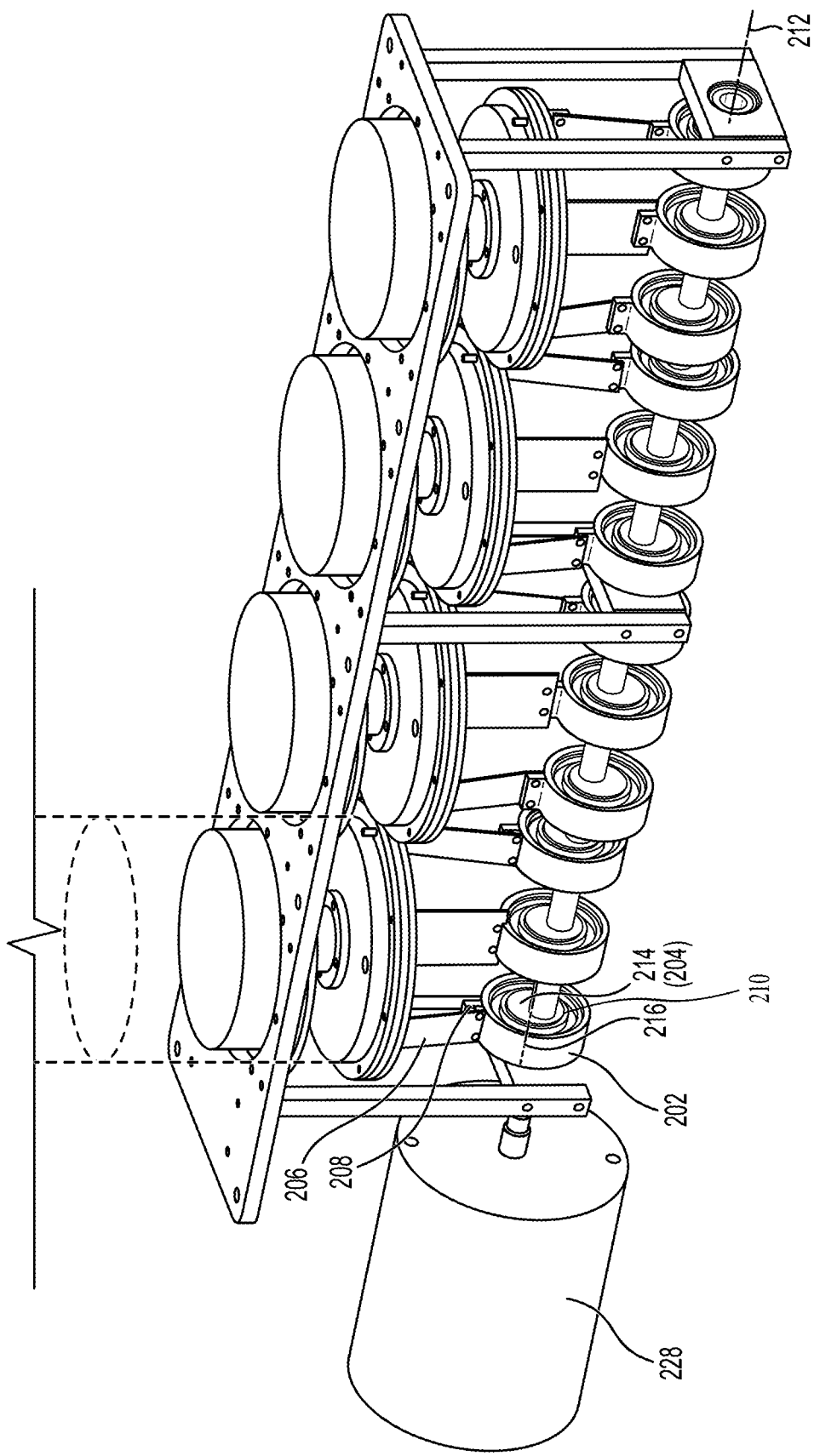
FIG. 6A is a perspective view of an exemplary apparatus for converting between linear motion and rotary motion, according to embodiments of the present disclosure.
Figure 6B:
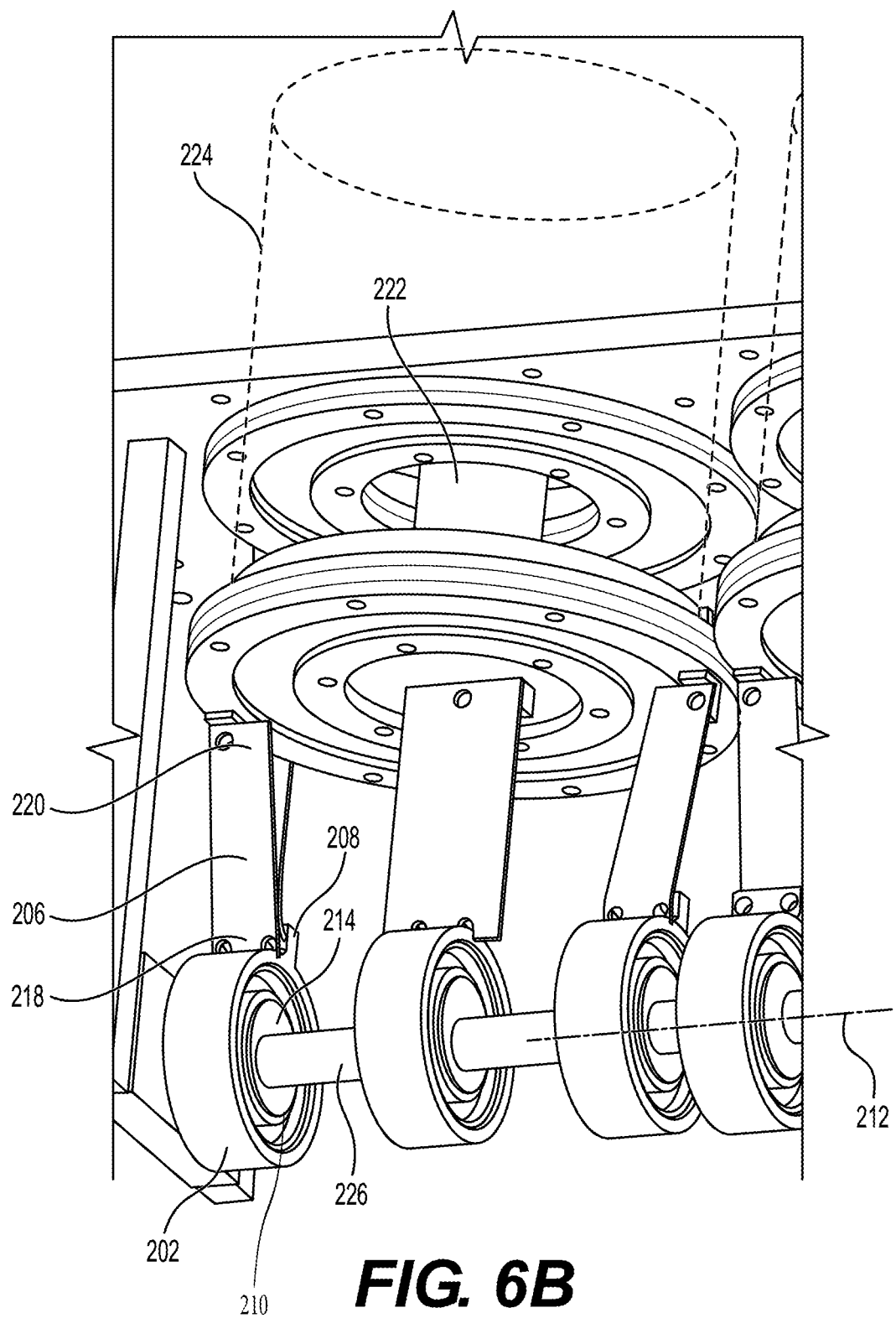
FIG. 6B is a perspective view of the exemplary apparatus in FIG. 6A.

FIGS. 6A, 6B, and 6C depict views of an exemplary apparatus for converting between linear motion and rotary motion, according to some embodiments of the present disclosure. In some embodiments, rotary flex joint 200 may be configured to convert between linear motion and rotary motion. Rotary flex joint 200 may include a plate 202, a wobbler assembly 204, and a flexure 206.

In some embodiments, plate 202 may include at least one connection point 208 extending outwards and a channel 210 through the center of plate 202. Wobbler assembly 204 may include two offset axes. Wobbler assembly 204 may rotate about a first axis 212. Wobbler assembly 204 may include at least one cylindrical body 214, which may have a second axis 216 parallel to and offset from first axis 212.

In some embodiments, flexure 206 may include a first end 218 and a second end 220, defining a length extending in a direction perpendicular to second axis 216. Flexure 206 may have a width extending parallel to second axis 216 and a thickness extending perpendicular to second axis 216.

In some embodiments, first end 218 of flexure 206 may be connected to a first connection point of the at least one connection point 208 of plate 202, and second end 220 of flexure 206 may be configured to move in a direction perpendicular to first axis 212.

In some embodiments, as shown in FIGS. 6A-6C, rotary flex joint 200 may have multiple plates 202, wobbler assemblies 204, and flexures 206. The multiple sets of plate, wobbler assembly, and flexure may share a same first axis 212 and may be arranged in parallel. For example, plates 202a, 202b, . . . , 202n may be arranged in parallel. Each of those plates may include cylindrical bodies (e.g., cylindrical body 214) and may have a second axis 216 in parallel with, but offset from first axis 212 and each of their own second axes. The relative offset of each second axis may determine the phase offset of the corresponding linear motion. Each of plates 202 may include a flexure (e.g., flexure 206). The flexure of each plate may have a length that extends in substantially in the same direction, which may be perpendicular to second axis 216.

In some embodiments, second ends 220 of flexures 206 may be configured to move or be moved by a linear driver, such as a piston or actuator. For example, second ends 220 of flexures 206 may be driven by a Stirling-cycle engine, heat engine, internal combustion engine, or other linear power producing device (not shown in FIGS. 6A-6C). In some embodiments, second ends 220 of flexures 206 may be driven by a piston rod 222 of a Stirling-cycle engine, or by the cylinder body 224 of the Stirling-cycle engine. In some embodiments, multiple of wobbler assembly 204 may share a single shaft 226 connecting their cylindrical bodies 214. Shaft 226 may be disposed with its axis inline with first axis 212, and may be connected to and drive a device receiving rotational input. For example, shaft 226 may drive electrical generator 228 as shown.

Figure 6D:
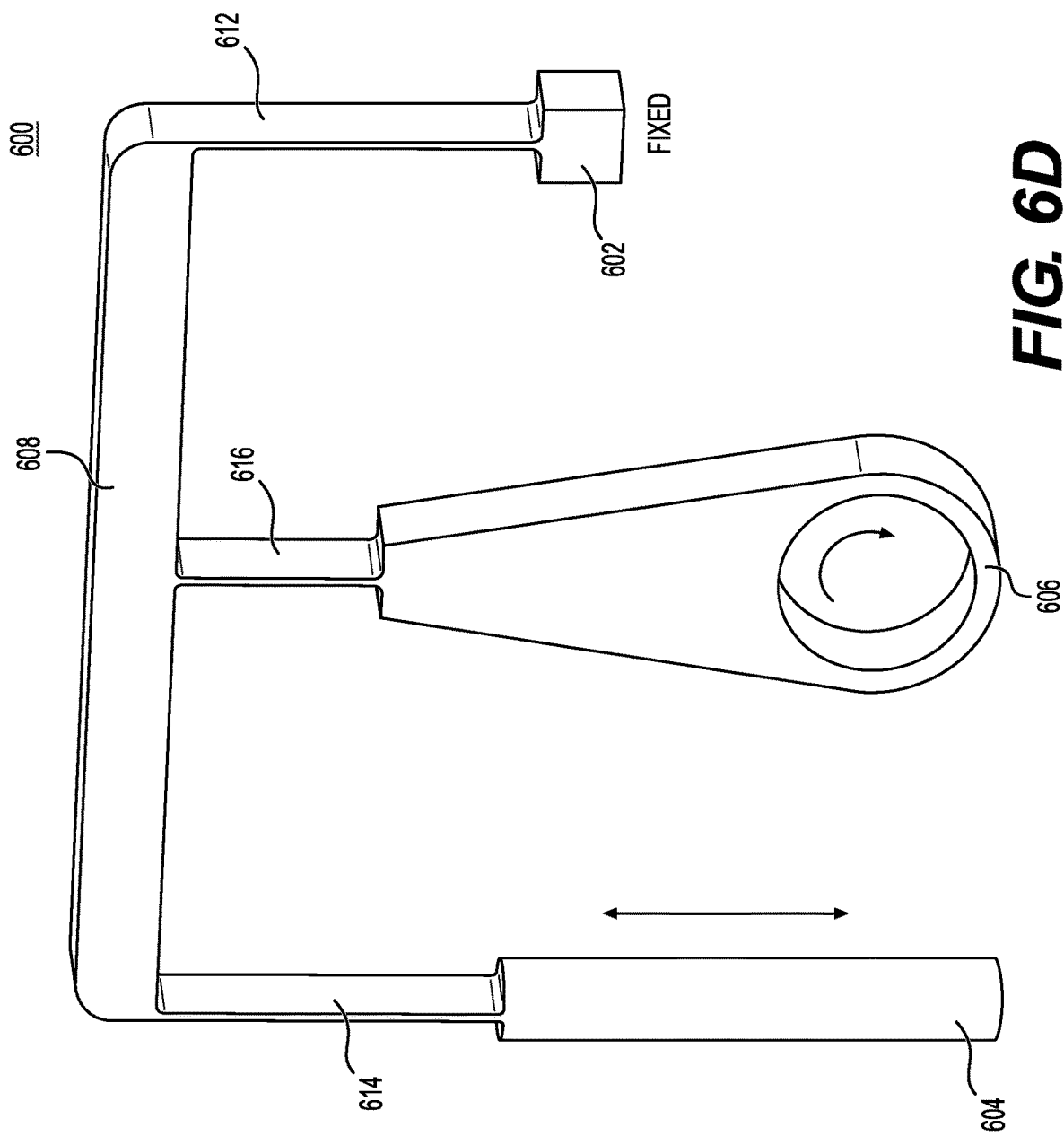
FIG. 6D is a is a perspective view of an exemplary apparatus for converting between linear motion and rotary motion, according to some embodiments of the present disclosure.

FIG. 6D is a is a perspective view of an exemplary apparatus for converting between linear motion and rotary motion, according to some embodiments of the present disclosure. In some embodiments, flexure assembly 600 may replace plate 202, flexure 206, and piston rod 222. Flexure assembly 600 may be an assembly or manufactured to one single piece or multiple pieces.

In some embodiments, flexure assembly 600 may be generally a flat structure with a thickness. Flexure assembly 600 may have a fixed end 602, a piston rod 604, and a plate 606 disposed between fixed end 602 and piston rod 604. Each of fixed end 602, piston rod 604, and plate 606 may be connected to a beam 608 by a flexure. For example, fixed end 602 is connected to beam 608 by flexure 612, piston rod 604 is connected to beam 608 by flexure 614, plate 606 is connected to beam 608 by flexure 618. In some embodiments, flexures 612, 614, 616 are parallel to each other and at an angle to beam 608. In some embodiments, flexures 612, 614, 616 are perpendicular to beam 608. In some embodiments, beam 608 may have a higher stiffness than the flexures. In some embodiments, piston rod 604 may move along the longitudinal direction of flexure 614. In some embodiments, plate 606 may mate with cylindrical body 214, where the center axis of plate 606 offsets from first axis 212. Therefore, plate 606 and flexure 616 may move along the longitudinal direction of flexure 616. In some embodiments, flexures 612, 614, 616 may deflect in a same direction. Different amount of deflection may accommodate fixed end 602 to remain fixed, piston rod 604 to move linearly without rotation, and plate 606 remain engaged with cylindrical body 214.

Flexure assembly 600 may offer the benefit of adjusting the amplitude or range of linear motion independent of the offset a wobbler. For example, by increasing the distance between flexures 612 and 614, the system may provide a larger linear motion with the same rotational input. In some embodiments, an amplification ratio n may be defined as the ratio of the distance between flexures 612 and 614 to the distance between flexures 612 and 616. In some embodiments, when plate 606 is subjected to rotary input, the movement along the longitudinal direction of flexure 616 may be converted to linear movement of flexure 614 and piston rod 604 n times amplified. In some embodiments, when piston rod 604 is subjected to linear movements, plate 606 may move along the longitudinal direction of flexure 606 with amplitude n times reduced.

Figure 6E:
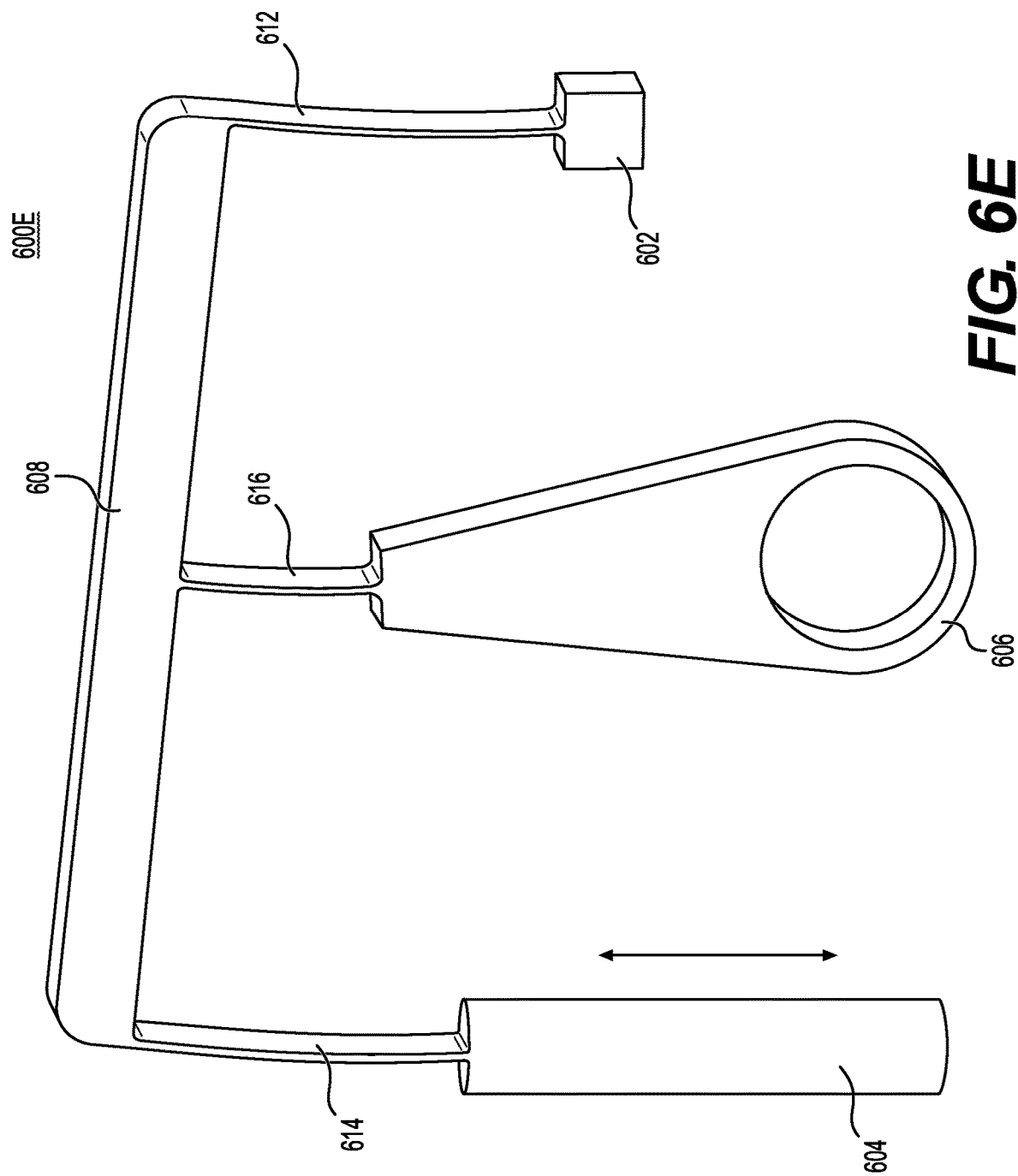

FIGS. 6E and 6F are perspective view of example configurations of the exemplary apparatus shown in FIG. 6D, according to embodiments of the present disclosure. In some embodiments, as shown in FIG. 6E, piston rod 610 may have an upward displacement, bending flexure 614 towards fixed end 602. Flexures 612 and 616 bend in the same direction, resulting plate 606 moving slightly upwards. As shown in FIG. 6F, piston rod 610 may have an downward displacement, bending flexure 614 away from fixed end 602. Flexures 612 and 616 bend in the same direction, resulting plate 606 moving slightly downwards as well. The offset of center axis of plate 606 and first axis 212 may then translate this repetitive movement into a rotary movement.

Although described as a linear to rotary conversion, this exemplary apparatus may also convert rotary to linear. In some embodiments, a rotary movement about first axis 212 may cause plate 606 to move up and down due to the offset of axis. This up and down movement may then be amplified and drive piston rod 604 to have a repetitive linear movement.

Figure 7A:
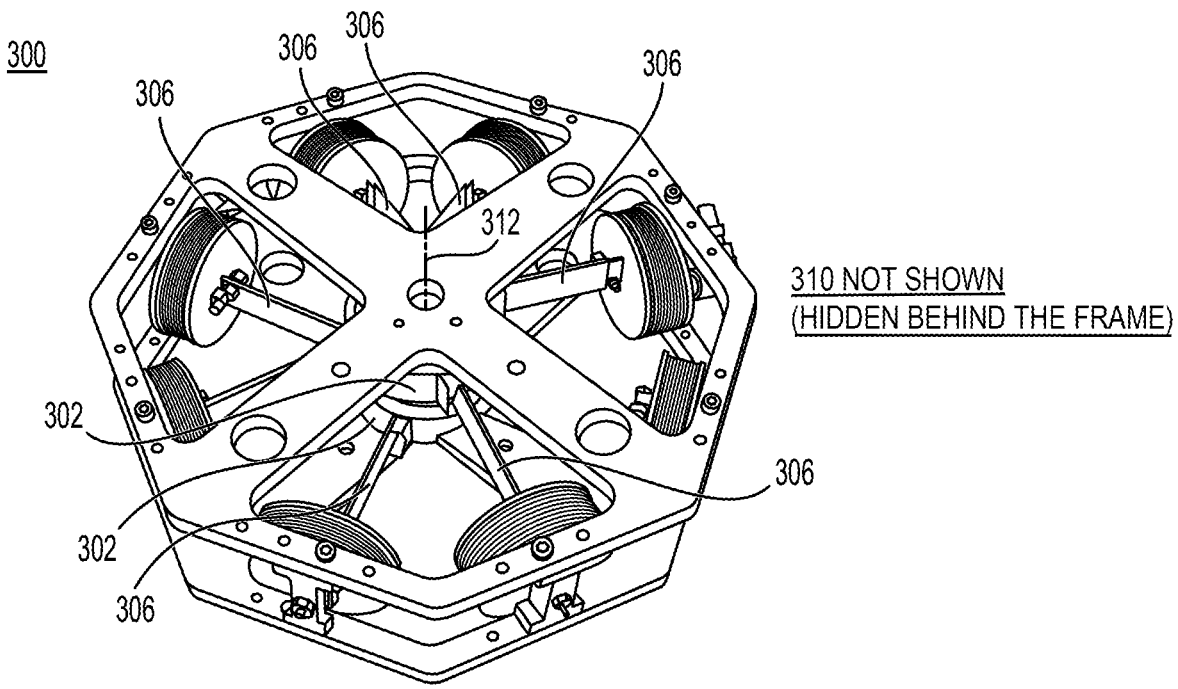
FIG. 7A is a perspective view of an exemplary apparatus for converting between linear motion and rotary motion, according to embodiments of the present disclosure.
Figure 7B:
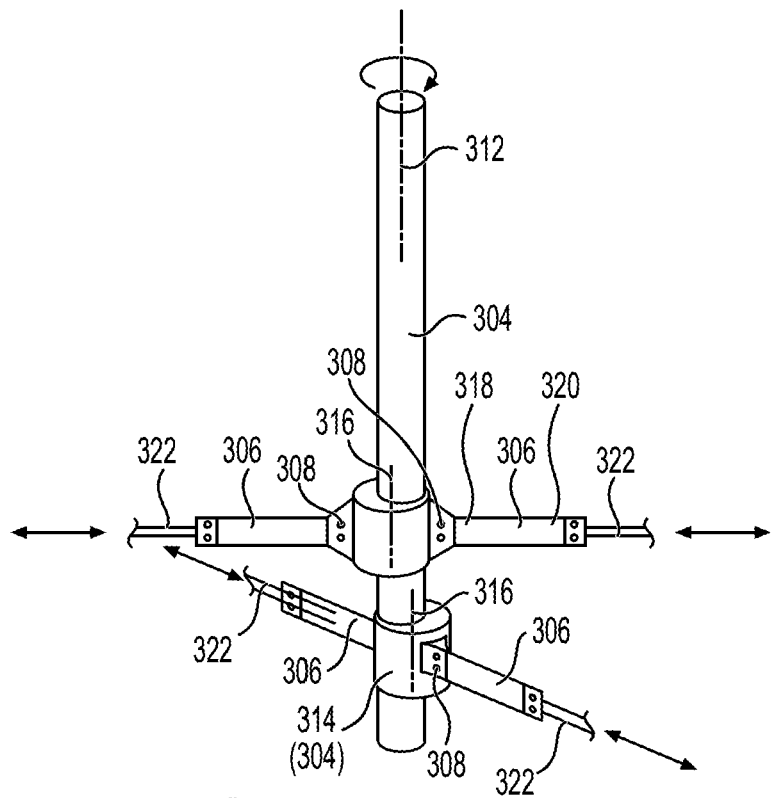
FIG. 7B is an illustration of the core mechanism of the exemplary apparatus in FIG. 7A.

FIG. 7A is a perspective view of yet another exemplary apparatus 700A (also referred to as rotary flex joint 700A) for converting between linear motion and rotary motion, according to some embodiments of the present disclosure. FIG. 7B is an illustration of an embodiment of core mechanism 700B of exemplary apparatus 700A of FIG. 7A. Apparatus 700A may be configured to convert between linear motion and rotary motion. In some embodiments, rotary flex joint 300 may include at least one plate 302, at least one wobbler assembly 304, and multiple flexures 306. Apparatus 700A may differ from other embodiments in that the linear motion may extend in multiple orientations radially about the axis of rotation.

In some embodiments, each of plate 302 may include a respective connection point 308 and a channel 310 through the center of plate 302. The connection point 308 may extend outwards, radially from the axis of rotation of the rotary motion. Each wobbler assembly 304 may include two axes that are parallel but offset. Each wobbler assembly 304 may rotate about a same first axis 312. Each wobbler assembly 304 may include a cylindrical body 314, which may have its own second axis 316, parallel to and offset from first axis 312. Plate 302 and wobbler assembly 304 may be connected and may be configured to allow relative rotary movement about second axis 316.

In some embodiments, each of flexures 306 may have a first end 318 and a second end 320, which may define a length extending in a direction perpendicular to first axis 312. Each flexure 306 may have a width extending parallel to first axis 312 and a thickness. In some embodiments, first end 318 of each flexure 306 may be connected to a different connection point 308 of plate 302, and second end 320 of each flexure 306 may be configured to move in a direction perpendicular to first axis 312. In some embodiments, different flexure 306 may have its second end 320 moving in a different direction, but all substantially towards first axis 312.

As shown in FIG. 7A, rotary flex joint 700A may include multiple plates 302 and corresponding wobbler assemblies 304. In some embodiments, the number of plates and wobbler assemblies may match. One plate 302 and one wobbler assembly 304 may mate together and connect to multiple flexures 306. For each plate 302 and wobbler assembly 304, first axis 312 may be inline or colinear, but second axes 316 may be parallel with an offset. In some embodiments, multiple flexures 306 may be connected to a single plate 302 and may be equally spaced about first axis 302. In some embodiments, each plate 302 may connect to the same number of flexures 306.

In some embodiments, each flexure 306 may have its second end 320 connected to and drive (or be driven by) rod 322. Rog 322 may connect to a linear input or output, such as a piston of an internal combustion engine, a heat engine, a Stirling-cycle engine, a cryocooler, a pump, an actuator, or a compressor. These examples are intended to provide a nonlimiting illustration of only a portion of the potential input and output mechanisms and should not limit the particular application of the rotary flex joints described in this disclosure. In some embodiments, rods 322 have repetitive linear movements in a substantially radial direction perpendicular to axis 312. Similar to rotary flex joint 100, each rod 322 may reach its extremes sequentially. As such, wobbler assembly 304 is driven to rotate about axis 312, converting from linear repetitive movements of rods 322.

Figure 8:
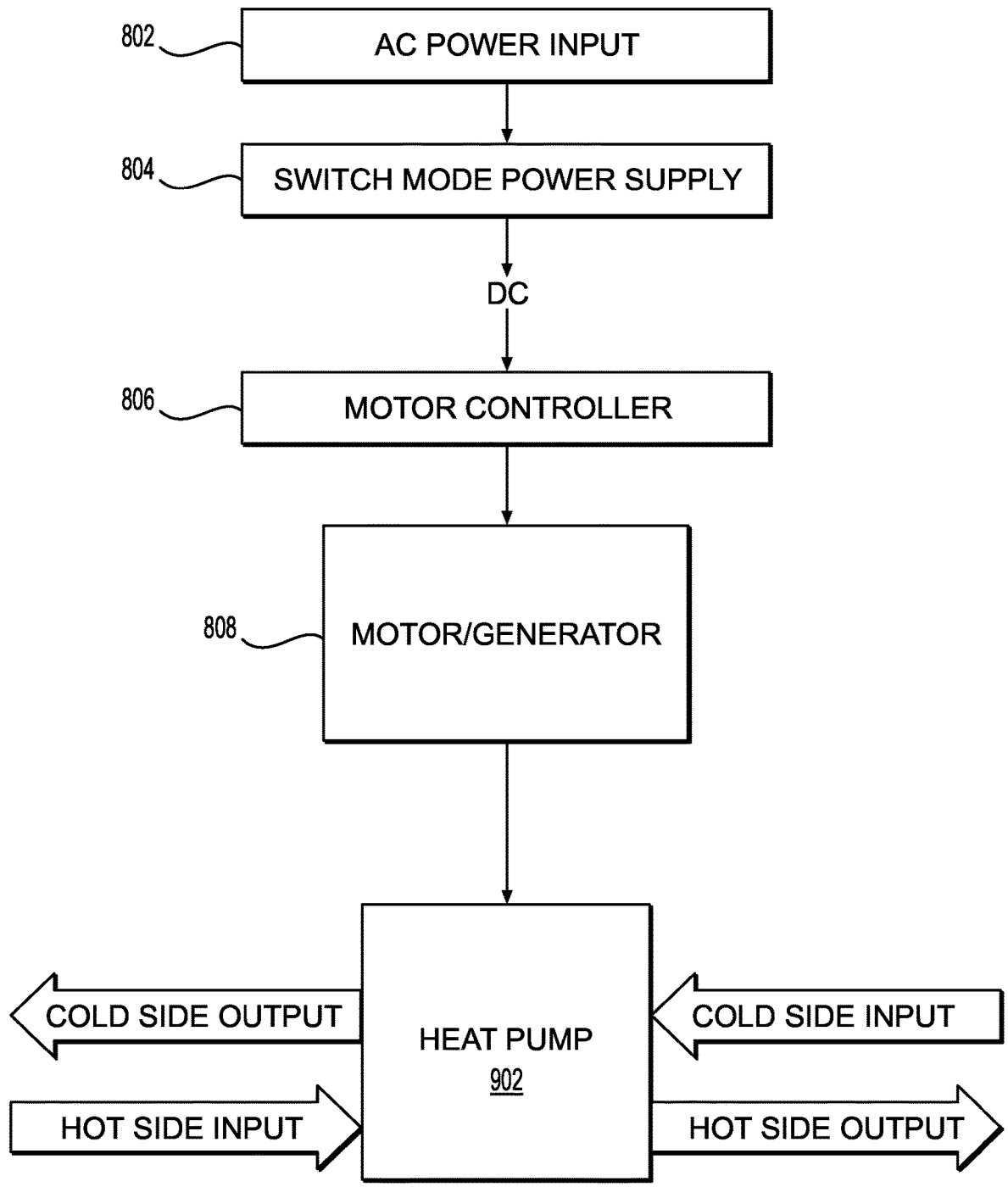
FIG. 8 is a schematic representation of a system for converting between electrical and thermal energy, according to some embodiments of the present disclosure.

FIG. 8 is a schematic representation of example system 800 for converting between electricity and thermal energy, according to embodiments. In some embodiments, system 100 may include AC power input 802, switch mode power supply 804, motor controller 806, motor/generator 808, and heat pump 902. Although system 800, as shown, may suggest that it is used to convert electrical power to create a temperature differential, in some embodiments, system 100 may generate electrical power from a thermal differential. For example, heat pump 902 may operate as a heat engine, creating mechanical movement that drives motor/generator 808 to create electrical power. And in some embodiments, DC (direct current) power generated by motor/generator 808 may be inverted to create AC (alternating current) power.

In some embodiments, AC power input 802 may provide power in the form of alternating electrical current (e.g., 120 VAC, 240 VAC). AC power input 802 is transformed to DC by a switch mode power supply 804. A motor controller 806 may control the power input of, and the performance of, motor/generator 808. Although not shown, in some embodiments, motor/generator 808 may drive shaft 138 of a rotary flex joint (e.g., rotary flex joint 100, rotary flex joint 200, rotary flex joint 700A). In this example, the rotary flex joint can convert the rotational motion to a repetitive linear motion. For example, the linear motion may drive rods (e.g., rods 130 of rotary flex joint 100, rods 222 of rotary flex joint 200, rods 322 of rotary flex joint 700A). The rods may connect to drive pistons of heat pump 902. In some embodiments, heat pump 902 may be a Stirling-cycle engine, such as a four-cylinder alpha-configuration Stirling-cycle engine. Other configurations of Stirling-cycle engines and other heat engines may be used in system 800, consistent with disclosed embodiments.

Figure 9:
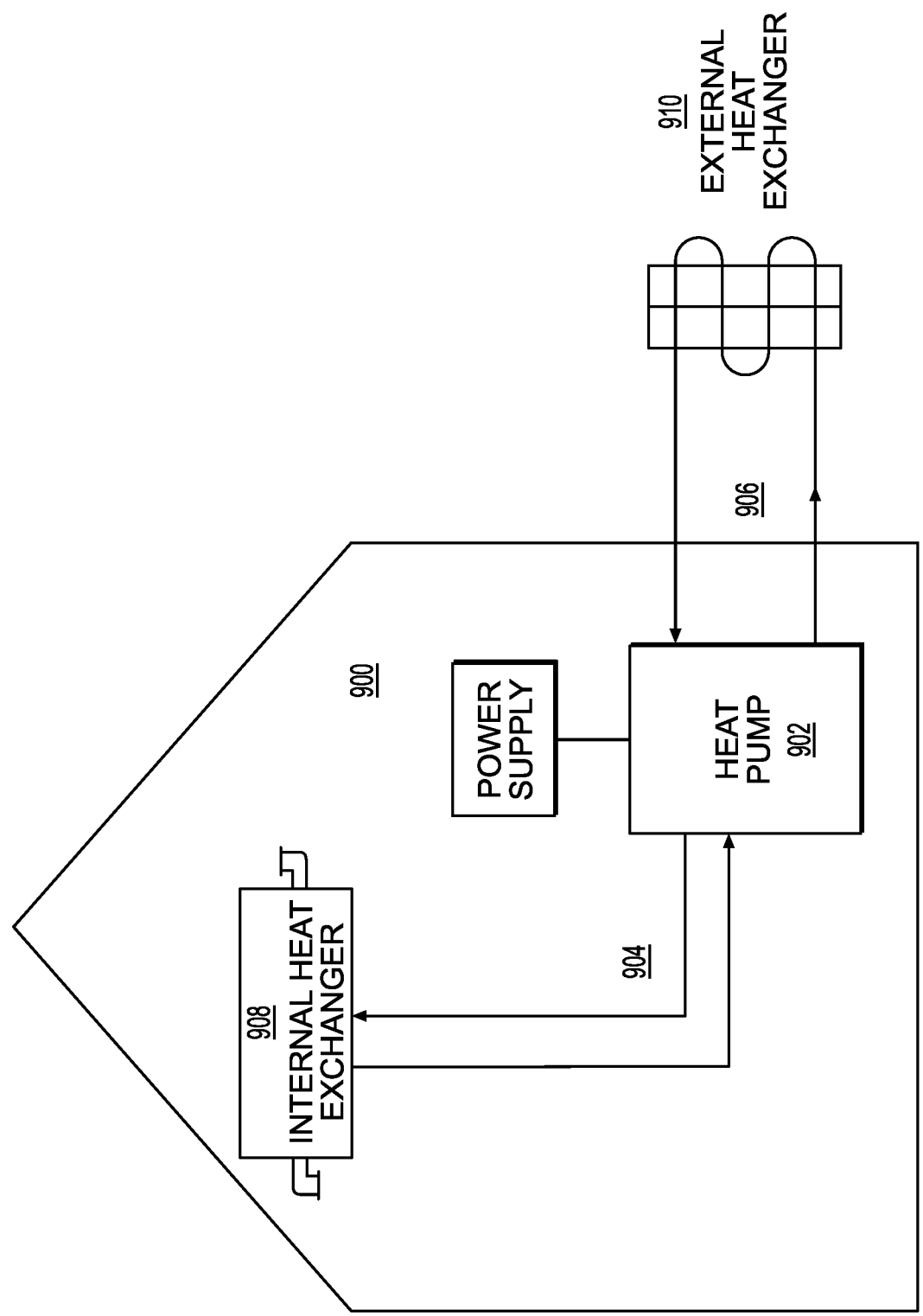
FIG. 9 is a schematic representation of heat pump system, according to embodiments of the present disclosure.

FIG. 9 is a schematic illustration of an exemplary heat pump system 900, according to embodiments of the present disclosure. In some exemplary embodiments, system 900 may include a heat pump 902, internal heat exchanger 908, external heat exchanger 910, and power supply 920. System 900 may use power supply 920 to drive heat pump 902 to cool a working fluid to provide air conditioning to cool a structure, such as a residence or commercial building.

In some embodiments, heat pump 902 may be a Stirling-cycle heat pump, running a reversed Stirling cycle to generate a temperature differential. The temperature differential may cool one side of the heat engine while heating another side. Each side may use a working fluid to transfer the heat, or lack thereof, to a heat exchangers. For example, heat pump 902 may include two working fluid cycles (e.g., working fluid cycle 904 and working fluid cycle 906), which may connect heat pump 902 to respective heat exchangers. Cycle 904 may circulate cold-side working fluid between heat pump 902 and an internal heat exchanger 908 on the inside of dwelling. For example, cycle 904 may provide cool working fluid to an internal heat exchanger to cool an indoor space. Cycle 906 may circulate hot-side working fluid between heat pump 902 and an external heat exchanger 910 on the outside of dwelling. For example, cycle 906 may allow hot-side working fluid to radiate outdoors, external to the insulation of the environment that is being cooled. In this example where cycle 904 operates on the cold side and cycle 906 operates on the hot side, system 900 may function as an air conditioner. In an embodiment, cycle 904 may operate using the hot side of heat pump 902 and cycle 906 may operate on the cold side of heat pump 902. In this example embodiment, system 900 may operate as a heater.

Figure 10:
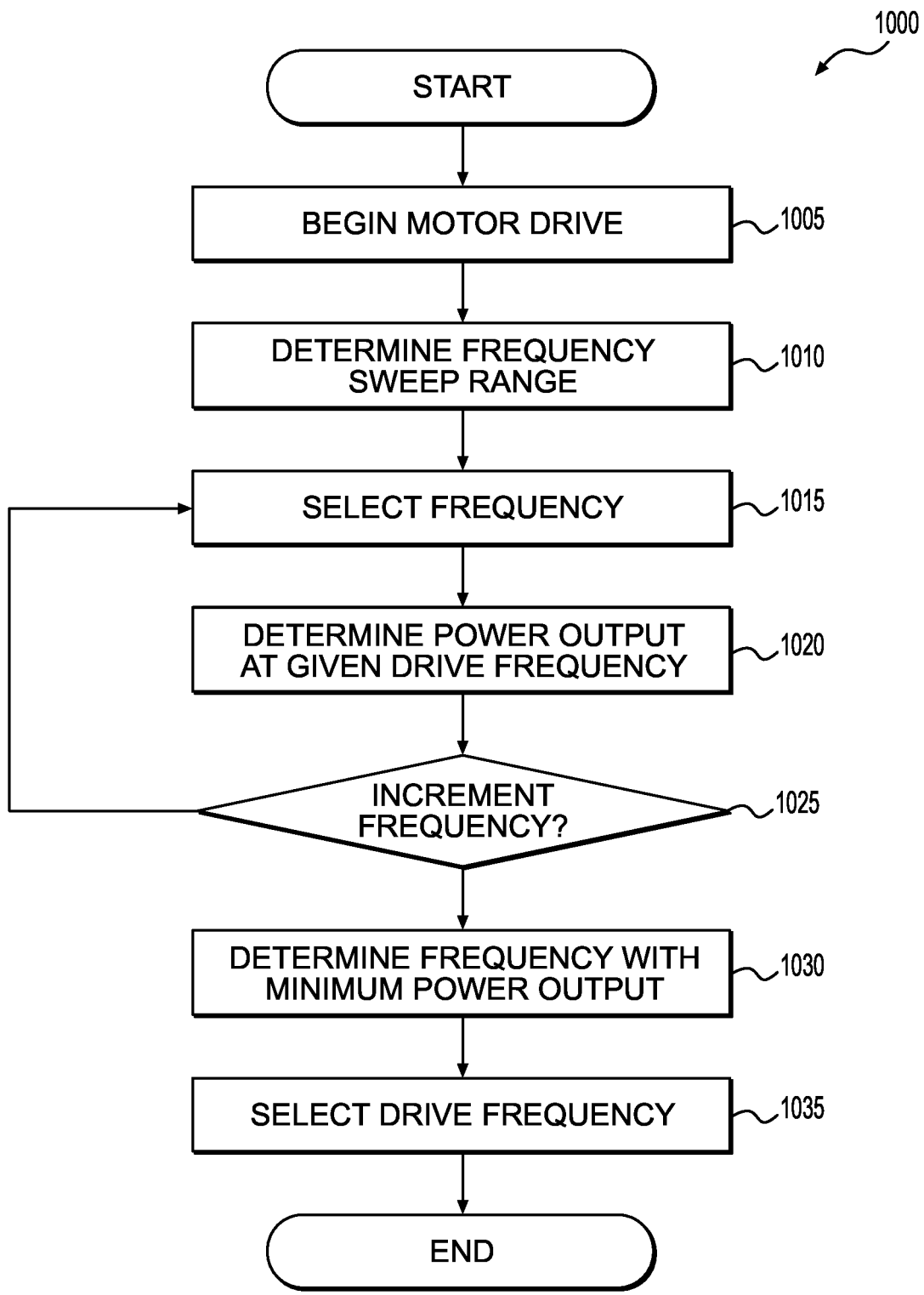
FIG. 10 is a flowchart of an exemplary method for determining drive frequency, according to embodiments of the present disclosure.

FIG. 10 is a flowchart of method 1000 for identifying a drive frequency for operating a heat pump, in accordance with embodiments of the present disclosure. It is understood that additional operations may be performed before, during, and/or after method 1000 depicted in FIG. 10, and that some other processes may only be briefly described herein. Method 1000 can be performed using a heat pump and a drive with a controllable frequency. For example, method 1000 can be implemented using system 800, such as using motor controller 806, motor 808, and/or heat pump 902. The heat pump may be connected to the motor using one or more of the mechanical assemblies disclosed for converting between linear and rotary motion (e.g., rotary flex joint 100, rotary flex joint 200, rotary flex joint 300). In this example electricity is used to power a motor to drive a heat pump.

Method 1000 may identify an efficient frequency to operate the heat pump. In some embodiments, an electrical motor may have an adjustable rotational drive frequency. When the electrical motor operates at a rotational frequency matching the resonant frequency of the heat pump, the heat pump may operate at maximum efficiency. While a system could rely on the predetermined frequency to attempt to operate at this resonant frequency and achieve efficient operation, the resonant frequency of a heat pump may change over time. For example, environmental factors such as pressure and temperature may affect the resonant frequency. Additionally, while heat pumps are typically sealed systems, they may experience gradual pressure losses over time, which may also affect their resonant frequency. Therefore, it may be beneficial to periodically determine the resonant frequency of the heat pump to ensure that it the motor driving the heat pump operates.

Heat pumps may be sealed systems with a resonant frequency that may not be easily adjusted once manufactured. Therefore, it can be difficult to tune a heat pump to a particular resonant frequency. The motor or generator (e.g., motor/generator 808) connected to a heat pump or heat engine (e.g., heat pump 902) can be tuned to be driven or drive rotary motion at a particular frequency, such as by using a controller (e.g., motor controller 806). Method 1000 may identify the particular frequency of the motor or generator so that it operates at the resonant frequency of the connected heat pump, allowing the resulting system to operate with increased efficiency.

In step 1005, method 1000 may begin a motor drive. In some embodiments, a motor controller may initialize and begin operation of a connected motor to drive a heat pump. For example, in the context of system 800, motor controller 806 may initiate motor/generator 808 to drive heat pump 902.

In step 1010, method 1000 may determine a frequency sweep range. In some embodiments, step 1010 may include a motor controller identifying the range of frequencies with which a connected motor should be driven. For example, in the context of system 800, motor controller 806 may identify a rage of frequencies with which to use to sample power output as motor/generator 808 drives heat pump 902. The range of frequencies may be fixed, such as a predetermine range of frequencies that are stored in nonvolatile memory. In other embodiments, the range of test frequencies may be dynamic. For example, motor controller 806 may store the last frequency used to drive heat pump 902 and identify a range of frequencies based on an offset (e.g., a predetermined offset above and below) that frequency. In still other embodiments, system 800 may dynamically adjust the frequency range to sample consistent with root-finding algorithms, such as iterative methods (e.g., Newton's method, Secant method, Brent's method).

In step 1015, method 1000 may select a frequency. In some embodiments, step 1015 may include select a predetermined initial frequency. In other embodiments, method 1000 may identify an initial frequency based on the range identified in step 1010. For example, system 800 may select a random frequency within the determined frequency range, the high-end of the range, or the low-end of the range.

In step 1020, method 1000 may determine output at the selected frequency. In some embodiments, step 1020 may include determining the power draw on the motor generator at the selected operating frequency. For example, system 800 may utilize motor controller 806 to determine the current draw necessary for motor generator 808 to operate at the selected frequency. In some embodiments, system 800 may measure the power output produced by heat pump 902 in step 1020. For example, system 800 may include temperature probes to evaluate the temperature differential of the hot side and cold side of heat pump 902 to determine the thermal power output. Still other methods of determine the power output at a given drive frequency may be used consistent with this disclosure.

In step 1025, method 1000 may determine whether to increment the frequency. In some embodiments, step 1025 may include system 800 evaluating whether power output should be sampled for additional frequencies. For example, system 800 may determine whether further increments in the frequency would fall outside the range of frequencies to sweep (e.g., from step 1010). In other embodiments, system 800 may determine that no further sampling should be completed because the sampled power output is increasing, which may indicate that the minimum power output has already been sampled. For example, system 800 may evaluate the sampled power output with each iteration and may determine whether a local minimum has been reached in the plot of power output. In the context of dynamic sampling, such as root-finding algorithms, system 800 may evaluate whether the results have converged and, if not, what the next appropriate sampling frequency should be. Because the number of samples that need to be tested to find the efficient operational frequency directly corresponds to the time at which it takes method 1000 to complete, dynamic root-finding algorithms may be useful to reduce the number of iterations required to identify the efficient operating frequency for the system. If method 1000 determines that the frequency can be further incremented (e.g., step 1025, "YES"), method 1000 may return to step 1015. If method 1000 determines that the frequency should not be further incremented (e.g., step 1025, "NO"), method 1000 may proceed to step 1030.

In step 1030, method 1000 may determine the frequency with the minimum power output. In some embodiments, step 1030 may include system 800 evaluating the test data to verify the drive frequency which resulted in the minimum power output. In the context of dynamic root-finding algorithms, system 800, such as motor controller 806, may include a processor that validates the root-finding. In the example of a range of sampled frequencies, motor controller 806 may include a processor that evaluates the sampling data to determine the drive frequency with the lowest power output. In an example, the evaluation may include selecting the drive frequency that had the lowest power output. In another example, the evaluation may include fitting a curve to the drive frequency data to form an equation where power output is a function of drive frequency and solving for the minimum of that function.

In step 1035, method 1000 may select a drive frequency. In some embodiments, step 1035 may include system 800 utilizing the selected frequency from step 1030 to operate. For example, motor controller 806 may control motor/generator 808 to drive heat engine 902 at the selected frequency.

While method 1000 is primarily discussed in the context of using electrical power to drive a heat engine, method 1000 may be used for power generation. For example, heat pump 902 may function as a heat engine that converts a temperature differential to kinetic energy (e.g., a linear movement). This movement may drive a generator (e.g., motor generator 808), and system 800 may control the generator to be driven at a particular frequency, consistent with the steps described for method 1000.

As an addition or alternative to method 1000, embodiments may include adjustments to match resonant frequency specific to the context of generating electrical power from a Stirling cycle engine. For example, a Stirling cycle engine (e.g., heat pump 902 operating in a power generation configuration) may naturally operate at its resonant frequency when no load is applied. Therefore, disclosed embodiments may ensure the Stirling cycle engine operates at its resonant frequency, which may increase efficiency, by first applying a temperature differential and determining the operating frequency of the engine without load. Disclosed embodiments (e.g., system 800) may then control the generator (e.g., motor generator 808) to apply the maximum load at which the Stirling cycle engine maintains the determined resonant frequency.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the terms "and/or" and "or" encompass all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for converting linear motion to rotary motion about a first axis, comprising:
    a plurality of assemblies, each assembly including:
        a plate having at least one connection point extending outwards and a channel through the center;
        a wobbler having an end that extends along the first axis and at least one cylindrical body having a second axis that is parallel to the first axis and offset from the first axis;
            wherein the plate is rotatably connected to the cylindrical body and configured to rotate about the second axis; and
        a flexure having a first end, a second end, a length extending in a direction perpendicular to the second axis, a width extending parallel to the second axis, and a thickness;
            wherein the first end of the flexure is connected to a first connection point of the at least one connection point of the plate, and the second end of the flexure is configured to move in a direction perpendicular to the first axis;
    wherein each second axis of the plurality of assemblies has its own respective offset from the first axis,
    wherein the flexures of the plurality of assemblies are spaced apart and in parallel to one another, and extend in substantially the same direction perpendicular to the respective second axis, and
    wherein the flexures of the plurality of assemblies include at least a first flexure and a second flexure adjacent to the first flexure, the second end of the first flexure being connected to a piston rod, the second end of the second flexure being connected to a cylinder body, and the piston rod being configured to drive through the cylinder body.

2. The apparatus of claim 1, wherein the flexures of the plurality of assemblies are each a flat spring.

3. The apparatus of claim 1, wherein the flexures of the plurality of assemblies are each arranged to deflect in a direction tangential to the first axis.

4. The apparatus of claim 1, wherein the piston rod is subjected to a linear repetitive movement.

5. The apparatus of claim 4, wherein the piston rod is driven by a Stirling-cycle engine.

6. The apparatus of claim 1, wherein the end of the wobbler is connected to an electrical generator.

7. The apparatus of claim 1, wherein the end of the wobbler is connected to an electrical motor.

8. The apparatus of claim 7, wherein the rod drives a Stirling-cycle heat pump, and wherein the electrical motor drives the Stirling-cycle heat pump at a resonant frequency of the Stirling-cycle heat pump.

9. The apparatus of claim 1, wherein the plate is rotatably connected to the cylindrical body by one or more bearings.

10. The apparatus of claim 9, wherein the one or more bearings are cylindrical roller bearings.

* * * * *